Sept. 30, 1941. A. L. PARKER 2,257,427
ANGLE FITTING AND METHOD OF MAKING SAME
Filed March 2, 1940
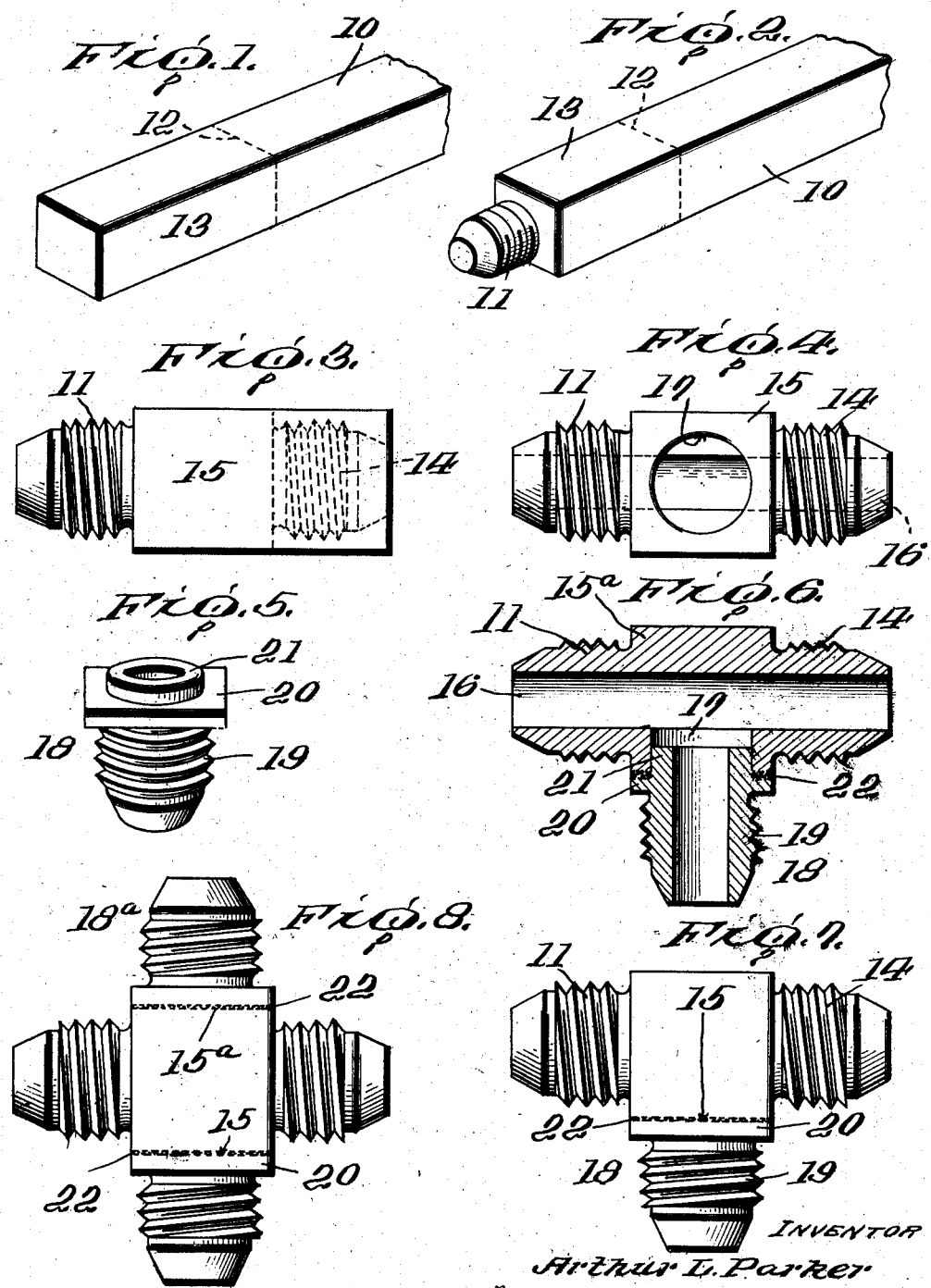
INVENTOR
Arthur L. Parker
By Mason + Porter
ATTORNEYS Patented Sept. 30, 1941

2,257,427

UNITED STATES PATENT OFFICE 2,257,427

ANGLE FITTING AND METHOD OF MAKING SAME

Arthur L. Parker, Cleveland, Ohio

Application March 2, 1940, Serial No. 321,995

5 Claims. (Cl. 29—157)

The present invention is generally concerned with the metal working art, but is more particularly concerned with new and useful improvements in an angle tube or pipe fitting and to improvements in the method of making such a fitting.

In fluid supply lines, it is often desirable to employ various forms of tube or pipe couplings for joining the ends of the tubes or pipes. In the production of relatively small tube or pipe fittings, some difficulty has been encountered in economically producing small angle fittings of the type which includes one or more angle branches. It has been common practice to cast or mold these fittings in one piece, and then machine work the extremities of the fittings separately. In the production of such angle fittings, such as elbows or T couplings, it has also been proposed to machine work these fittings from bar stock. These methods of producing angle fittings are expensive in that they require complicated and expensive machinery for operating on the relatively small fittings.

An object of the present invention is to provide an angle fitting of the above type and a method of making such an angle fitting which will greatly reduce the cost of manufacture and which will greatly simplify the production thereof.

A further object of the invention is to provide an angle fitting consisting of separate parts or branches which are secured together without the necessity of utilizing a complicated machine securing operation.

A further object of the invention is to provide a method of producing such an angle fitting wherein at least one of the angle branches is secured to the fitting by brazing so as to eliminate the necessity of employing a separate machine securing operation.

The above and other objects of the invention will in part be obvious, and will be hereinafter more fully pointed out.

In the accompanying drawing,

Figure 1 is a fragmentary perspective view of a metal bar from which the fitting is produced.

Figure 2 is a similar fragmentary perspective view showing one end of the bar after it has been machine worked to provide a threaded end portion.

Figure 3 is an enlarged side elevation showing the slug including the machined end section, after it has been cut from the bar, and illustrating, in dotted lines, the manner in which the opposite end of the slug may be similarly machined.

Figure 4 is a side elevation of Figure 3 after the opposite end of the slug has been machined to provide a threaded end portion and also showing the passages through the slug.

Figure 5 is a detail perspective view of an angle branch after it has been cut from the bar of Figures 1 and 2 and properly machined.

Figure 6 is a side elevation, in section, showing the manner in which the angle branch of Figure 5 is secured to the machined slug of Figure 4.

Figure 7 is a side elevation of Figure 6.

Figure 8 is a side elevation of a modified form of angle fitting, showing a plurality of angle branches.

According to the present invention, the tube or pipe coupling is relatively small and is in the form of an angle fitting. This angle fitting or coupling is produced from an extruded bar 10 (Figure 1) which is preferably of square cross section, although the cross section of the extruded bar may be of any other desired cross section. One end of the extruded bar 10 is machined to provide an externally threaded end portion 11, as shown in Figure 2. It is to be understood, of course, that this end of the bar may be machined to provide an internally threaded end portion if desired. The bar is then cut along the line 12 (Figure 2) to provide a slug section 13 which includes the machined end of the bar. This slug 13 is shown in Figure 3, and the opposite end thereof is also machined to provide an externally threaded end portion 14, as shown in Figure 4. Here again, it is to be understood that an internally threaded end portion may be provided on the slug, depending upon the type of fitting which is desired.

As shown in Figure 4, the externally threaded end portions 11, 14 are machined to a degree which leaves substantially square surfaces around the central portion of the slug 13. This slug section is longitudinally bored or drilled to provide a central fluid passage 16 therethrough, and one or more of the square central faces 15 are drilled or bored, as at 17, so as to afford an aperture in communication with the longitudinal passage 16. When it is desired to form a T fitting, only one of the faces 15 is bored, but other faces may be bored when it is desired to form other types of fittings having a plurality of angle branches.

The branch fitting 18 is shown in Figure 5, and this branch fitting may be formed from the same extruded bar in substantially the manner pointed out above. It is not necessary to produce this branch fitting from a square or rectangular bar since it may be produced from round bar stock. This branch fitting is provided with a single threaded end portion 19 which is illustrated as being externally threaded, but it may, if desired, be internally threaded. When this fitting is produced from a bar of square cross section, there is formed a relatively narrow square surface 20 at one end thereof, and this surface serves as a shoulder. A circular extension or skirt 21 is provided on the shoulder 20 and is of a size which is adapted to snugly fit within the opening or aperture 17 in one of the surfaces 15 of the slug 13 shown in Figure 4.

When the slug section of Figure 4 and the angle branch 18 of Figure 5 are assembled, as shown in Figure 6, to produce the finished angle fitting, the circular extension 21 on the angle branch snugly fits within the aperture 17 in the side 15 of the slug section. The shoulder 20 is disposed adjacent the surface 15 on the slug section, and as illustrated in the drawing, the periphery of the shoulder 20 is coincident with the periphery of the surface 15 on the slug section so as to provide an exact fit between the parts. These parts, that is, the slug section and the angle branch, are secured together by a brazing operation. A washer 22 of a suitable form of brazing material may be applied between the adjacent surfaces of the side 15 and the shoulder 20, and the assembled parts are then passed through a brazing furnace so as to cause the parts to become intimately united. However, the dipping method may be employed, in which case the angle branch may be dipped into a bath of molten brazing material before it is joined to the slug section.

Various forms of angle fittings may be produced in the above manner, and a double T fitting is shown in Figure 8. In the production of such a fitting, an opposite side surface 15a on the slug section 13 may be bored to provide an opening for receiving the circular extension on another angle branch 18a.

The parts are then brazed together in the manner described above. It is of course obvious that several angle branches may be secured to the central portion of the slug section and that elbow fittings may also be produced in this manner.

From the foregoing description, it will be seen that each separate part of the finished angle fitting is produced from bar stock from which a section of desired length is cut to provide a slug. The slugs are machined to provide the desired forms of thread or other connections and are secured together by a brazing operation. Thus, the present method eliminates the necessity of employing any machine operation for deforming one of the parts of the fitting or otherwise machine working one of the parts to effect the desired connection between the several parts.

It is to be clearly understood that minor changes in the details of construction and arrangement of parts, and also minor changes in the steps of the method may be employed without departing from the scope of the invention as set forth in the appended claims.

I claim:

1. An angle tube fitting, comprising a main section having a passage therein and a threaded portion at one end of the passage, said main section having a plurality of non-circular faces around the periphery thereof with at least one of said faces provided with an aperture therethrough in communication with said passage, an angle section having a passage therethrough and a threaded portion at one end thereof, said angle section having a shoulder portion adjacent the opposite end thereof and an extension on said shoulder portion fitting within the aperture in the apertured face of said main section, said shoulder portion having the peripheral edge thereof coinciding with the peripheral edge of the apertured face on the main section, and means providing a brazed connection between the adjacent surfaces of the apertured face on the main section and of the shoulder portion on the angle section whereby to connect said sections without employing a machine securing operation.

2. An angle tube fitting comprising a main section having externally threaded end portions and an intermediate portion consisting of a plurality of substantially square faces around the periphery thereof, said main section having a longitudinal passage therethrough and an aperture through at least one of said intermediate faces, an angle section having a passage therethrough and a threaded portion at one end thereof, said angle section having a shoulder portion adjacent the opposite end thereof and an extension on said shoulder portion fitting within the aperture in the apertured face on the main section, said shoulder portion having the peripheral edge thereof coinciding with the peripheral edge of the apertured face on the main section whereby the shoulder portion does not extend over the threaded end portions on the main section, and means providing a brazed connection between the adjacent surfaces of the apertured face on the main section and of the shoulder portion on the angle section whereby to connect said sections without employing a machine securing operation.

3. The method of producing an angle tube fitting from a length of bar stock having a non-circular cross section, which consists in machining one end of the bar stock to provide a threaded portion, cutting a slug from the machined end of the bar stock to provide a plurality of non-circular faces around the periphery of the slug, machine working the slug to provide a longitudinal passage through the threaded portion and also to provide an aperture through at least one of the faces and in communication with the passage, forming an angle section from bar stock having a cross section substantially identical with the periphery of the apertured face on the slug, forming a threaded portion at one end of the angle section whereby to leave a shoulder portion adjacent the opposite end thereof with the periphery of the shoulder substantially coincident with the periphery of the apertured face on the slug, forming an extension on the shoulder portion of the angle section, assembling the angle section and the slug with the extension fitting within the aperture in the face of the slug and with the peripheral edges of the shoulder portion and of the apertured face coinciding, and securing the angle section to the slug by a brazed connection between the adjacent surfaces on the shoulder portion of the angle section and the apertured face on the slug.

4. The method of producing an angle fitting from a length of bar stock of non-circular cross section, which consists in machining one end of the bar stock to provide a threaded portion, cutting a slug from the machined end of the bar stock, forming a threaded portion at the opposite end of the slug so as to leave a plurality of intermediate non-circular faces around the periphery of the slug, machine working the slug to provide a longitudinal passage therethrough in communication with the threaded end portions and to also provide an aperture through an intermediate face in communication with the passage, forming an angle section from bar stock having a cross section substantially identical with the periphery of at least one of the intermediate faces on the slug, forming a threaded portion at one end of the angle section whereby to leave a shoulder portion adjacent the opposite end thereof with the periphery of the shoulder portion substantially coincident with the periphery of the apertured intermediate face on the slug, forming an extension on the shoulder portion of the angle section, assembling the angle section and the slug with the extension fitting within the aperture in the intermediate face on the slug and with the peripheral surfaces of the shoulder portion and of the apertured intermediate face coinciding, and securing the angle section to the slug by a brazed connection between the adjacent surfaces on the shoulder portion of the angle section and the apertured intermediate face on the slug.

5. The method of producing an angle tube fitting from an extruded metal bar with a substantially square cross section, which consists in machining one end of the metal bar to provide a threaded portion, cutting a slug from the machined end of the metal bar, forming a threaded portion at the opposite end of the slug whereby to leave an intermediate peripheral portion consisting of a plurality of substantially square external faces, machine working the slug to provide a longitudinal passage therethrough in communication with the threaded end portions and to also provide an aperture through at least one of the intermediate faces in communication with the passage, forming an angle section from an extruded bar of substantially identical cross section and with a threaded portion at one end thereof whereby to leave a shoulder portion adjacent the opposite end thereof with the periphery of the shoulder portion substantially coincident with the periphery of the adjacent intermediate face on the slug, forming an extension on the shoulder portion of the angle section, assembling the angle section and the slug with the extension fitting within the aperture in the intermediate face on the slug and with the peripheral edges of the shoulder portion and of the adjacent intermediate face coinciding, and securing the angle section to the slug by a brazed connection between the adjacent surfaces of the shoulder portion on the angle section and the adjacent intermediate face on the slug.

ARTHUR L. PARKER.